United States Patent Office 2,751,248
Patented June 19, 1956

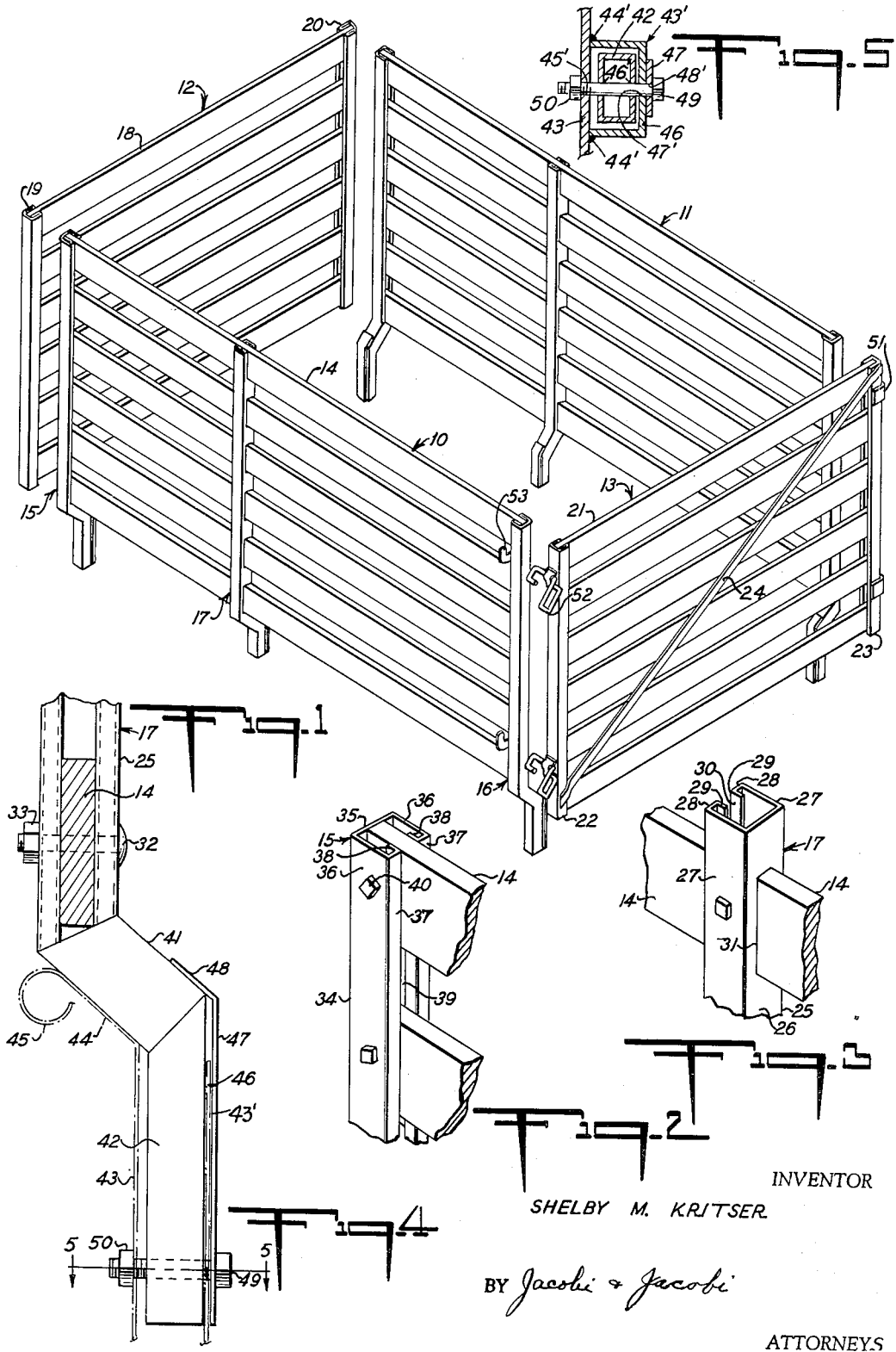

2,751,248

COMBINED STAKE RAIL CLAMP AND STAKE ANCHOR

Shelby M. Kritser, Amarillo, Tex.

Application June 9, 1955, Serial No. 514,170

15 Claims. (Cl. 296—43)

This invention relates to supports and more particularly to a stake which may be utilized to support side rails on the body of a vehicle, fence rails or gates and the like, together with means for clamping such rails to provide a rigid structure and also including means for anchoring the stake to a socket or other supporting structure therefor.

Heretofore, numerous types of stakes for supporting the side rails which form the body of a vehicle, such as a truck, have been proposed, but many of these provided no means for clamping such rails in place, or for securely anchoring the stake in place and consequently, the structure did not possess sufficient rigidity for the purpose intended and furthermore, the same was relatively noisy, due to the loose association of parts and consequently, these prior art structures have not proven too satisfactory.

It is accordingly an object of the invention to provide a combined stake rail clamp and stake anchor including means for securely clamping side rails in place on the stake and also for securely anchoring the stake in place in a supporting socket provided therefor.

A further object of the invention is the provision of a combined stake rail clamp and stake anchor, which may be conveniently utilized, either at an intermediate point or location, or at the ends of rails to firmly clamp such rails in place and provide a body, fence, gate or similar structure.

A still further object of the invention is the provision of a combined stake rail clamp and stake anchor which may be economically manufactured from readily available materials and which may be provided in various sizes in order to form a structure of any desired height.

Another object of the invention is the provision of a combined stake rail clamp and stake anchor which may be conveniently mounted in the conventional sockets provided in the body of a pickup truck and securely anchored thereto by a simple operation and without any major modifications of such sockets or body.

A further object of the invention is the provision of a combined stake rail clamp and stake anchor, particularly adapted for use on a pickup truck and which serves to provide a rack body of maximum size and which cooperates with the body and stake sockets provided on the pickup truck to limit penetration of the stakes into the sockets and to form a strong, rigid structure.

A still further object of the invention is the provision of a combined stake rail clamp and stake anchor, particularly for use on a pickup truck to provide a rack body and in which all parts are firmly clamped together and anchored to the body of the truck to form a strong, rigid structure thereby eliminating excessive noise due to loosely associated parts.

Further objects and advantages of the invention will be apparent from the following description taken in conjunction with the accompanying drawing wherein:

Fig. 1 is a view in perspective showing a rack body for a truck utilizing the combined stake rail clamp and stake anchor of this invention;

Fig. 2 a fragmentary perspective view with parts in section for greater clarity and showing the stake of this invention utilized for engaging and clamping the ends of side rails which serve to form the rack body;

Fig. 3 a fragmentary perspective view similar to Fig. 2, and showing a stake constructed in accordance with this invention and utilized at an intermediate point on the rails forming the body;

Fig. 4 a fragmentary elevational view with parts in section for greater clarity and showing a stake constructed in accordance with this invention and received in the stake socket provided on a pickup truck, together with the structure and operation of the stake anchor forming a part of the stake of this invention; and Fig. 5 a fragmentary sectional view taken substantially on the line 5—5 of Fig. 4.

With continued reference to the drawing, there is shown a rack body utilizing the combined stake rail clamp and stake anchor of this invention and which may well comprise opposed side racks 10 and 11, a front end rack 12 and a tail gate 13. The side rack 10 may well comprise a plurality of vertically spaced, horizontally disposed rails 11 formed by suitable boards or the like and such rails 14 may be supported in vertically spaced horizontal relationship by end stakes 15 and 16 and by intermediate stake 17. While only one intermediate stake is shown, obviously, as many stakes as necessary may be utilized and the number would be determined by the length of the side rack 10. However, since all intermediate stakes 17 would be substantially identical in construction, it is only considered necessary to show and describe one such stake.

The side rack 11 is formed in a similar manner to the side rack 10 and the front end rack 12 may be formed by vertically spaced, horizontally disposed rails 18 and end members 19 and 20. The tail gate 13 may be formed by vertically spaced, horizontally disposed rails 21, end members 22 and 23 and a diagonal brace member 24.

With particular reference to Figs. 3 and 4, the intermediate stake 17 may well comprise an elongated body 25 of channel cross section having a web 26, substantially parallel sidewalls 27, spaced walls 28 opposite the web 26, such walls 28 terminating in inturned spaced, substantially parallel flanges 29 which provide an elongated slot 30. The web 26 is provided with longitudinally spaced apertures 31 of a size and configuration to receive the rails 14 and a sufficient number of apertures 31 will be provided to receive the desired number of rails 14. As shown in Fig. 4, a bolt or other suitable fastening means, 32 extends through the sidewalls 27 of the stake 17 and also through each rail 14 and upon tightening of the nut 33 on the bolt 32, the flanges 29 will be moved toward each other and into clamping engagement with the sides of the rails 14 thereby firmly clamping such rails in place on the body 25 of the stake 17.

The end stakes 15 and 16 are formed in a similar manner to the intermediate stake 17 and with particular reference to Fig. 2, it will be seen, that an end stake 15 may well comprise an elongated body 34 of channel cross section having a web 35, sidewalls 36, spaced walls 37 opposite the web 35, such walls terminating in inturned flanges 38 which serve to provide an elongated slot 39. The main difference between the end stake 15 and the intermediate stakes 17 is the fact that the apertures 31 in the web are omitted, and the web 35 of the end stake 15 is imperforate. As will be seen, the side rails 14 are received in the elongated groove 39 and with the ends of such rails 14 abutting the inner surface of the web 35 of the body 34. The rails 14 are retained in position and the flanges 38 engaged with the sides of such rails 14 to clamp the same in position by bolts or other suitable fastening means 40 extending through the sidewalls 36 and each rail 14.

With particular reference to Fig. 4, there is shown an anchoring means for securely supporting and anchoring both the intermediate stake 17 and the end stakes 15 and 16 in place on the body of a pickup truck and, as will be seen, there is provided at the lower end of the body 25 of the stake 17, a laterally extending angularly disposed extension 41 to the lower end of which is secured an elongated base 42 of substantially rectangular cross section. Shown in phantom in Fig. 4 and in section in Fig. 5 is a sidewall 43 forming the body of a pickup truck and such sidewall is commonly formed of sheet metal and terminates at its upper edge in an angularly disposed, outwardly extending portion 44 provided with a bead 45 along the outer edge thereof. At suitable intervals along the sidewall 43 there is provided horizontally spaced vertically disposed sockets 43' for receiving stakes and such sockets are commonly formed by a channel member secured to the sidewall 43 as by welding 44' and having a web 46 spaced therefrom inwardly of the truck body. As will be seen from an inspection of Figs. 4 and 5, the base 42 of the stake 17 is received in the socket 43' with the angularly disposed extension 41 engaging the angularly disposed portion 44 of the sidewall 43 and in order to securely anchor the stake 17 in place in the socket 43', there is provided an elongated anchor strap 47 which is secured at 48 to the angular extension 41 and the strap 47 extends downwardly in spaced relation to the base 42 and along the side of the web 46 of the stake socket 43' facing inwardly of the truck body. In this way, web 46 is received between the anchor strap 47 and the base 42 of the stake 17. Aligned apertures 45', 46', 47' and 48' are provided in the sidewall 43 of the truck body, the base 42 of the stake 17, the web 46 of the stake socket and the anchor strap 47 respectively and received in such apertures is a suitable fastening means, such as a bolt 49 extending therethrough and provided with a nut 50 on the opposite side to securely clamp the anchor strap 47 in engagement with the web 46 of the socket 43' and thereby securely anchor the stake 17 in place on the body of the truck.

It is to be noted, that the end members 19 and 20 of the front end rack 12 may be formed by stakes similar to the end stakes 15 and 16, but with the angular extension 41 and base portion 42 omitted. In this manner, the flanges may be clamped against the rails 18 to securely hold the same in place and the front end rack 12 secured to the end stakes 15 in any desired manner.

The tail gate 13 likewise, may be provided with end members 22 and 23, formed in the same manner as the stakes above described, but omitting the angular extension 41 and base 42, and, if desired, the end member 23 may be provided with hinges 51 for mounting one side of the tail gate on the side rack 11 and the end member 22 of the tail gate 13 may be provided with suitable latch members 52 which may cooperate with hooks 53 secured to the end stake 16 for releasably holding the tail gate 13 in closed position.

While the combined stake rail clamp and stake anchor of this invention is primarily intended to be utilized to provide a rack body on pickup trucks, as above described, it will be obvious, that this same structure may be as well utilized for providing fences, gates or other similar structures, in which case, the stakes would, of course, be secured to sockets embedded in the earth or, in the case of gates, the anchoring means would, in all probability, be omitted and the stakes formed similar to the end members 19 and 20 on the front end rack 12, as above described.

It will be seen that by the above described invention, there has been provided a combined stake rail clamp and stake anchor which may be utilized to form a rack body of any desired size in which the elements of each body unit are securely clamped together, thereby forming a rigid structure and which also serves to securely anchor such body in place in the conventional stake sockets provided in the body of a pickup truck or similar vehicle. The stakes of this invention may be conveniently and economically manufactured from readily available materials and in any desired lengths or sizes and furthermore, a complete rack body may be shipped or packaged in knocked-down condition and assembled by the user without the use of special tools, other than a conventional wrench.

It will be obvious to those skilled in the art that various changes may be made in the invention without departing from the spirit and scope thereof and therefore the invention is not limited by that which is shown in the drawing and described in the specification, but only as indicated in the appended claims.

What is claimed is:

1. A stake of the character described comprising an elongated body of channel cross section having a web, substantially parallel sidewalls, spaced walls opposite said web terminating in inturned spaced substantially parallel flanges providing an elongated slot, said web having longitudinally spaced apertures whereby spaced rails may extend through said slot and said apertures, fastening means extending through said sidewalls and said rails to clamp said flanges in engagement with said rails, a laterally extending angularly disposed extension on one end of said body, an elongated base of substantially rectangular cross section secured to said extension and disposed in substantially parallel offset relation to said body, an anchor strap secured to said extension and disposed in spaced substantially parallel relationship to said base and said base and said strap having aligned apertures whereby said base may be disposed in a socket with said extension engaging an end edge of said socket and with a wall of said socket received between said strap and said body, said aligned apertures registering with apertures in opposed walls of said socket to receive fastening means for anchoring said stake to said socket.

2. A stake of the character described comprising an elongated body of channel cross section having a web, substantially parallel sidewalls, spaced walls opposite said web terminating in inturned spaced substantially parallel flanges providing an elongated slot, whereby spaced rails may be received in said slot with the ends of such rails engaging said web, fastening means extending through said sidewalls and said rails to clamp said flanges in engagement with said rails, a laterally extending angularly disposed extension on one end of said body, an elongated base of substantially rectangular cross section secured to said extension and disposed in substantially parallel offset relation to said body, an anchor strap secured to said extension and disposed in spaced substantially parallel relationship to said base and said base and said strap having aligned apertures whereby said base may be disposed in a socket with said extension engaging an end edge of said socket and with a wall of said socket received between said strap and said body, said aligned apertures registering with apertures in opposed walls of said socket to receive fastening means for anchoring said stake to said socket.

3. A stake of the character described comprising an elongated body of channel cross section having a web, sidewalls, spaced walls opposite said web terminating in inturned spaced flanges providing an elongated slot, said web having longitudinally spaced apertures whereby spaced rails may extend through said slot and said apertures, fastening means extending through said sidewalls and said rails to clamp said flanges in engagement with said rails, a laterally extending angularly disposed extension on one end of said body, an elongated base secured to said extension and disposed in substantially parallel offset relation to said body, an anchor strap secured to said extension and disposed in spaced substantially parallel relationship to said base and said base and said strap having aligned apertures whereby said base may be disposed in a socket with said extension engaging an end edge of said socket and with a wall of said socket received between said strap and said body, said aligned apertures registering with apertures in opposed walls of said socket to receive fastening means for anchoring said stake to said socket.

4. A stake of the character described comprising an elongated body of channel cross section having a web, sidewalls, spaced walls opposite said web terminating in inturned spaced flanges providing an elongated slot, whereby spaced rails may be received in said slot with the ends of said rails engaging said web and fastening means extending through said sidewalls and said rails to clamp said flanges in engagement with said rails.

5. A stake of the character described comprising an elongated body of channel cross section having a web, sidewalls, spaced walls opposite said web terminating in inturned spaced flanges providing an elongated slot, said web having longitudinally spaced apertures whereby spaced rails may extend through said slot and said apertures and fastening means extending through said sidewalls and said rails to clamp said flanges in engagement with said rails.

6. A stake of the character described comprising an elongated body of channel cross section having a web, sidewalls, spaced walls opposite said web providing an elongated slot, said web having longitudinally spaced apertures whereby spaced rails may extend through said slot and said apertures, fastening means extending through said sidewalls and said rails to clamp said spaced walls in engagement with said rails, a laterally extending angularly disposed extension on one end of said body, an elongated base secured to said extension and disposed in substantially parallel offset relation to said body, an anchor strap secured to said extension and disposed in spaced substantially parallel relationship to said base and said base and said strap having aligned apertures whereby said base may be disposed in a socket with said extension engaging an end edge of said socket and with a wall of said socket received between said strap and said body, said aligned apertures registering with apertures in opposed walls of said socket to receive fastening means for anchoring said stake to said socket.

7. A stake of the character described comprising an elongated body of channel cross section having a web, sidewalls, spaced walls opposite said web providing an elongated slot, said web having longitudinally spaced apertures whereby spaced rails may extend through said slot and said apertures, fastening means extending through said sidewalls and said rails to clamp said spaced walls in engagement with said rails, a laterally extending angularly disposed extension on one end of said body, an elongated base secured to said extension and disposed in offset relation to said body, an anchor strap secured to said extension and disposed in spaced substantially parallel relationship to said base and said base and said strap having aligned apertures whereby said base may be disposed in a socket with said extension engaging an end edge of said socket and with a wall of said socket received between said strap and said body, said aligned apertures registering with apertures in opposed walls of said socket to receive fastening means for anchoring said stake to said socket.

8. A stake of the character described comprising an elongated body of channel cross section having a web, sidewalls, spaced walls opposite said web providing an elongated slot, whereby spaced rails may be received in said slot with the end of said rails engaging said web, fastening means extending through said sidewalls and said rails to clamp said spaced walls in engagement with said rails, a laterally extending angularly disposed extension on one end of said body, an elongated base secured to said extension and disposed in offset relation to said body, an anchor strap secured to said extension and disposed in spaced substantially parallel relationship to said base and said base and said strap having aligned apertures whereby said base may be disposed in a socket with said extension engaging an end edge of said socket and with a wall of said socket received between said strap and said body, said aligned apertures registering with apertures in opposed walls of said socket to receive fastening means for anchoring said stake to said socket.

9. A stake of the character described comprising an elongated body of channel cross section having a web, sidewalls, spaced walls opposite said web providing an elongated slot, said web having longitudinally spaced apertures whereby spaced rails may extend through said slot and said apertures, fastening means extending through said sidewalls and said rails to clamp said spaced walls in engagement with said rails, an elongated base secured to said body, an anchor strap secured to said base and disposed in spaced substantially parallel relationship thereto and said base and said strap having aligned pertures whereby said base may be disposed in a socket with a wall of said socket received between said strap and said base, said aligned apertures registering with apertures in opposed walls of said socket to receive fastening means for anchoring said stake to said socket.

10. A stake of the character described comprising an elongated body of channel cross section having a web, sidewalls, spaced walls opposite said web for providing an elongated slot, whereby spaced rails may be received in said slot with the ends of said rails engaging said web, fastening means extending through said sidewalls and said rails to clamp said spaced walls in engagement with said rails, a base secured to said body, an anchor strap secured to said base and disposed in spaced substantially parallel relationship to said base and said base and said strap having aligned apertures whereby said base may be disposed in a socket with a wall of said socket received between said strap and said base, said aligned apertures registering with apertures in opposed walls of said socket to receive fastening means for anchoring said stake to said socket.

11. A stake of the character described comprising an elongated body of channel cross section having a web, sidewalls, spaced walls opposite said web providing an elongated slot, said web having longitudinally spaced apertures whereby spaced rails may extend through said slot and said apertures, fastening means extending through said sidewalls to clamp said spaced walls in engagement with said rails, a laterally extending angularly disposed extension on one end of said body, an elongated base secured to said extension and disposed in offset relation to said body, an anchor strap secured to said extension and disposed in spaced substantially parallel relationship to said base and said base and said strap having aligned apertures whereby said base may be disposed in a socket with said extension engaging an end edge of said socket and with a wall of said socket received between said strap and said base, said aligned apertures registering with apertures in opposed walls of said socket to receive fastening means for anchoring said stake to said socket.

12. A stake of the character described comprising an elongated body of channel cross section having a web, sidewalls, spaced walls opposite said web providing an elongated slot, whereby spaced rails may be received in said slot with the ends of said rails engaging said web, fastening means extending through said sidewalls to clamp said spaced walls in engagement with said rails, a laterally extending angularly disposed extension on one end of said body, an elongated base secured to said extension and disposed in offset relation to said body, an anchor strap secured to said extension and disposed in spaced substantially parallel relationship to said base and said base and said strap having aligned apertures whereby said base may be disposed in a socket with said extension engaging an end edge of said socket and with a wall of said socket received between said strap and said base, said aligned apertures registering with apertures in opposed walls of said socket to receive fastening means for anchoring said stake to said socket.

13. A stake of the character described comrising an elongated body of channel cross section having a web, sidewalls, spaced walls opposite said web providing an elongated slot, said web having longitudinally spaced apertures whereby spaced rails may extend through said slot and said apertures, fastening means extending through said sidewalls to clamp said spaced walls in engagement with said rails, a laterally extending angularly disposed extension on one end of said body, an elongated base secured to said extension and disposed in offset relation to said body, an anchor strap secured to said extension and disposed in spaced substantially parallel relationship to said base whereby said base may be disposed in a socket with said extension engaging an end edge of said socket and with a wall of said socket received between said strap and said base and means for securing said strap to said socket.

14. A stage of the character described comprising an elongated body of channel cross section having a web, sidewalls, spaced walls opposite said web providing an elongated slot, whereby spaced rails may be received in said slots with the ends of such rails engaging said web, fastening means extending through said sidewalls to clamp said spaced walls in engagement with said rails, a laterally extending angularly disposed extension on one end of said body, an elongated base secured to said extension and disposed in offset relation to said body, an anchor strap secured to said extension and disposed in spaced substantially parallel relationship to said base whereby said base may be disposed in a socket with said extension engaging an end edge of said socket and with a wall of said socket received between said strap and said base and means for securing said strap to said socket.

15. A stake of the character described comprising an elongated body of channel cross section having a web, sidewalls, spaced walls opposite said web terminating in inturned spaced substantially parallel flanges providing an elongated slot, said web having longitudinally spaced apertures whereby spaced rails may extend through said slot and said apertures, and fastening means extending through said sidewalls to clamp said spaced flanges in engagement with said rails.

References Cited in the file of this patent

UNITED STATES PATENTS

| | | |
|---|---|---|
| 382,963 | Fowler | May 15, 1888 |
| 1,130,315 | McKinnis | Mar. 2, 1915 |
| 1,229,223 | Burr | June 12, 1917 |
| 1,388,008 | Taylor | Aug. 16, 1921 |
| 2,642,269 | Daniel | June 16, 1953 |
| 2,723,107 | Parker | Nov. 8, 1955 |